Feb. 11, 1958 L. M. WEINANDY 2,822,853
FLANGE FORMING APPARATUS WITH PROVISION FOR
READY INSERTION AND REMOVAL OF THE WORK
Filed Nov. 18, 1953 4 Sheets-Sheet 1
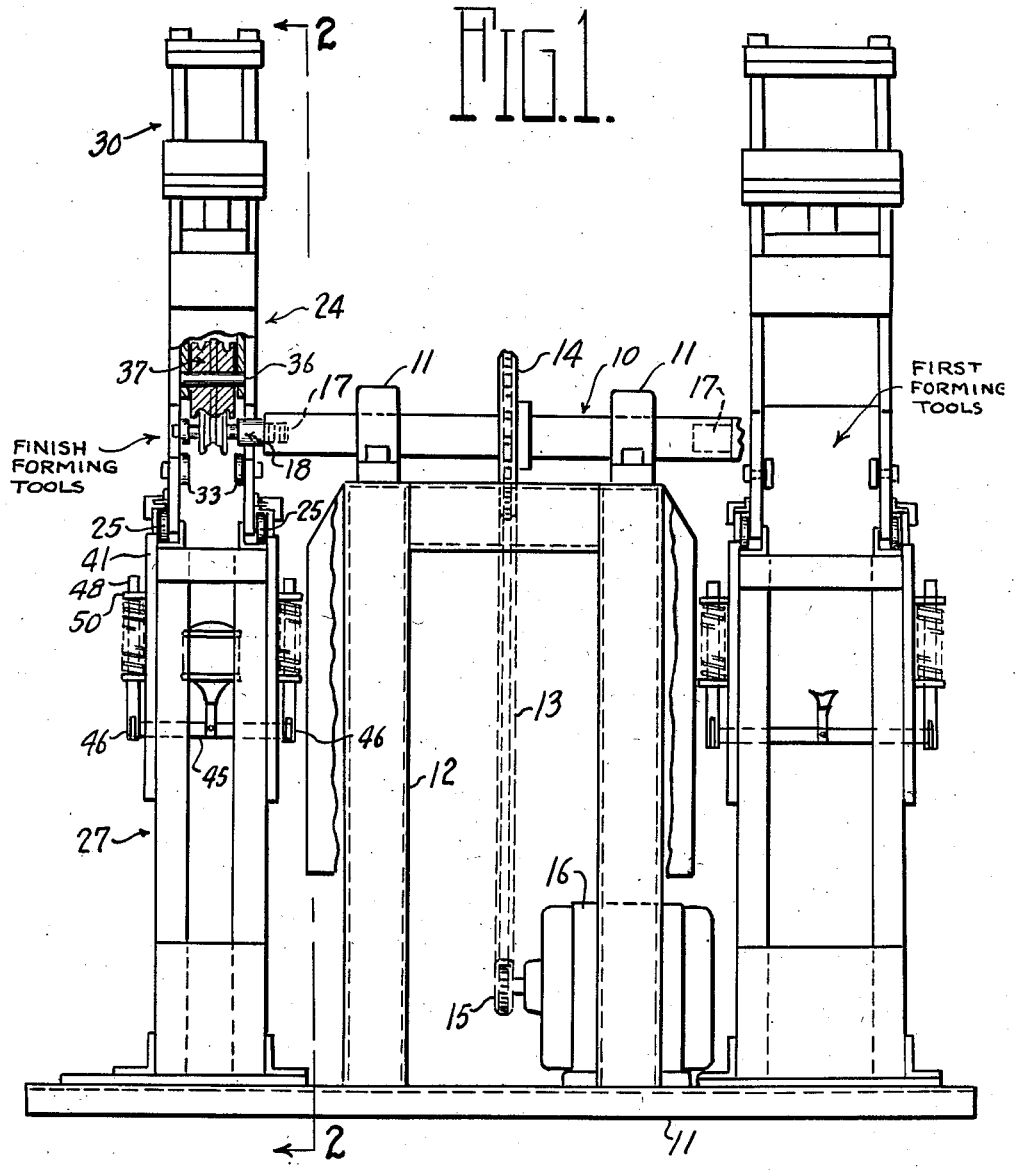
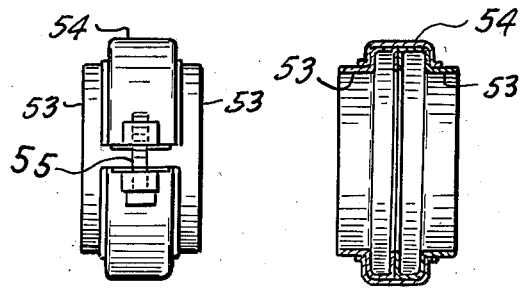
INVENTOR.
Leo M. Weinandy
BY
Charles J. Haughey
ATTORNEY Feb. 11, 1958 L. M. WEINANDY 2,822,853
FLANGE FORMING APPARATUS WITH PROVISION FOR
READY INSERTION AND REMOVAL OF THE WORK
Filed Nov. 18, 1953 4 Sheets-Sheet 2

INVENTOR.
Leo M. Weinandy
BY
Charles S Haughey
ATTORNEY

Feb. 11, 1958 L. M. WEINANDY 2,822,853
FLANGE FORMING APPARATUS WITH PROVISION FOR
READY INSERTION AND REMOVAL OF THE WORK
Filed Nov. 18, 1953 4 Sheets-Sheet 4

INVENTOR.
Leo M. Weinandy
BY
Charles P. Haughey
ATTORNEY.

United States Patent Office 2,822,853
Patented Feb. 11, 1958

2,822,853

FLANGE FORMING APPARATUS WITH PROVISION FOR READY INSERTION AND REMOVAL OF THE WORK

Leo M. Weinandy, Columbus, Ohio, assignor to Surface Combustion Corporation, Toledo, Ohio, a corporation of Ohio Application November 18, 1953, Serial No. 392,969

8 Claims. (Cl. 153—3)

This invention relates to apparatus for rolling annular members from tube stock and, more particularly, to improvements in apparatus for such purpose which permits rapid and facile insertion and removal of parts before and after forming and thus high speed production.

The apparatus of the invention is particularly designed for the high speed production of annular members having a flanged, channelled or grooved cross section, for example, annular flanged members employed as fittings in couplings for tubular structures such as flexible tubing. The formation of an annular flanged section having radially and angularly extending and tubular sections may be done by machining the element from an annular piece of relatively heavy cast metal for example. Some prior art devices mount the tubular or annular elements on the end of a rigidly supported shaft, for example a shaft mounted in a sturdy mandrel; others provide a removable ball, roller or other type of bearing block for the free end which must be removed in order to insert or remove a workpiece.

The principal object of this invention is to provide a machine in which an annular flanged element can be rapidly and efficiently rolled from tubular stock with both the radial dimensions and the longitudinal dimensions being held to relatively close tolerances and on which the parts can be produced rapidly and easily.

It is a further object of this invention to provide an apparatus in which an annularly extending flange, bead or profile can be rapidly rolled into tubular stock by the coaction of an interior and exterior die with the interior die supported on a normally unsupported free end of a rotary shaft.

It is yet another object of this invention to provide a machine for rolling configurations into tubular stock wherein the interior die shaft is normally not supported and which has means for supporting the free end of the shaft only during the rolling operation.

It is yet another object of this invention to provide a rolling machine for annular pieces and having an interior die shaft with a normally unsupported free end providing free access thereto so as to permit the rapid insertion and removal of workpieces onto and off of the die.

The invention as it pertains to the fabrication of annular flanged elements will be better understood from the drawings, in which:

Fig. 1 is a front view in elevation with parts broken away of a two station machine for forming short sections of tubing into annular flanged collar members for use in couplings, the machine having two forming parts for progressively changing the shape of the workpiece from the tubular section to the finished form.

Fig. 5 is a view in elevation of a coupling illustrating the end use of the annular elements the formation of which is illustrated on a machine embodying the invention in Figs. 1–4.

Fig. 6 is a vertical sectional view of the coupling shown in Fig. 5.

Figure 2:
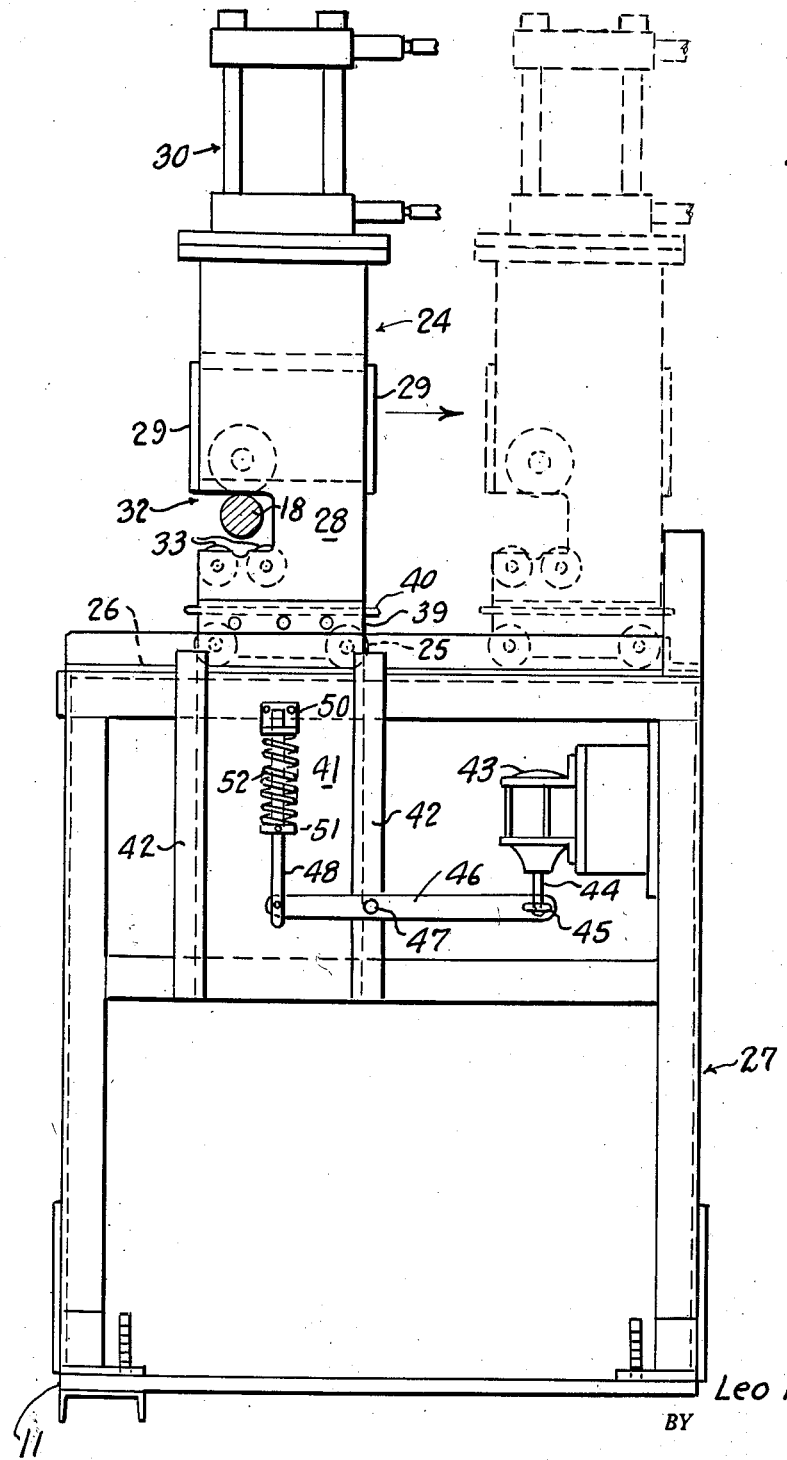
Fig. 2 is a vertical sectional view taken substantially on the line 2—2 of Fig. 1.

A machine embodying the invention has a main shaft 10 which is journalled in a pair of bearing blocks 11 that are in turn mounted atop a sturdy main frame 12. The shaft 10 is rotated by any suitable driving means, for example, by a drive chain 13 engaged with a sprocket 14 which is keyed to the shaft 10 and with a drive sprocket 15 of a main motor 16. The main shaft 10 extends horizontally beyond the frame 12 and terminates at each end in a threaded socket 17 for the reception of a die carrying arbor. In Fig. 1 an arbor 18 is shown at the left end of the shaft 10 and no arbor is indicated at the right end of the shaft 10. The general structure of the machine on both sides being identical, the description which follows will be limited to the left side of the machine. The only difference between the apparatus on the two sides of the machine is in the particular configuration of the forming dies, the dies mounted at the right side of the machine being shaped to change the shape of the part from the cylindrical section of tubing to an intermediate shape and those at the left side of the machine changing the intermediate shape to the finished workpiece.

In Figs. 1–4 inclusive, an apparatus embodying the invention is illustrated as designed for the production of annular elements having a complex cross sectional profile and which are intended for use as portions of a coupling illustrated in Figs. 5 and 6. While the description of the invention will be confined to a machine on which such elements can be produced, the particular configuration of the ribbed or flanged annular element and its end use do not constitute any part of the instant invention, and are shown herein as an illustration of the type of workpiece which the machine of the invention is adapted to produce.

Figure 3:
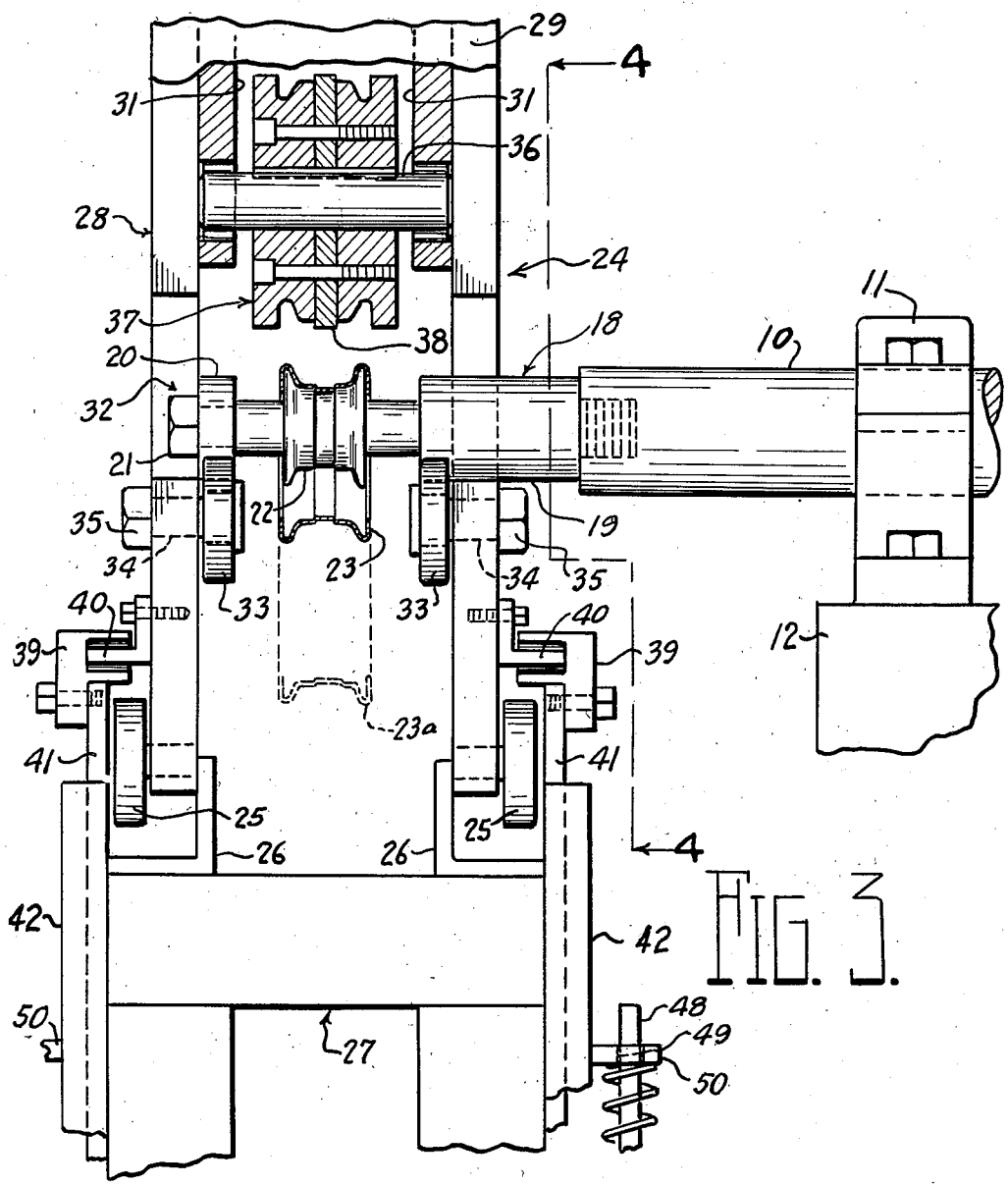
Fig. 3 is an enlarged fragmentary view in elevation of portions of the machine shown in Fig. 1 and in particular of the finished forming station with the parts thereof being shown in operating positions.
Figure 4:
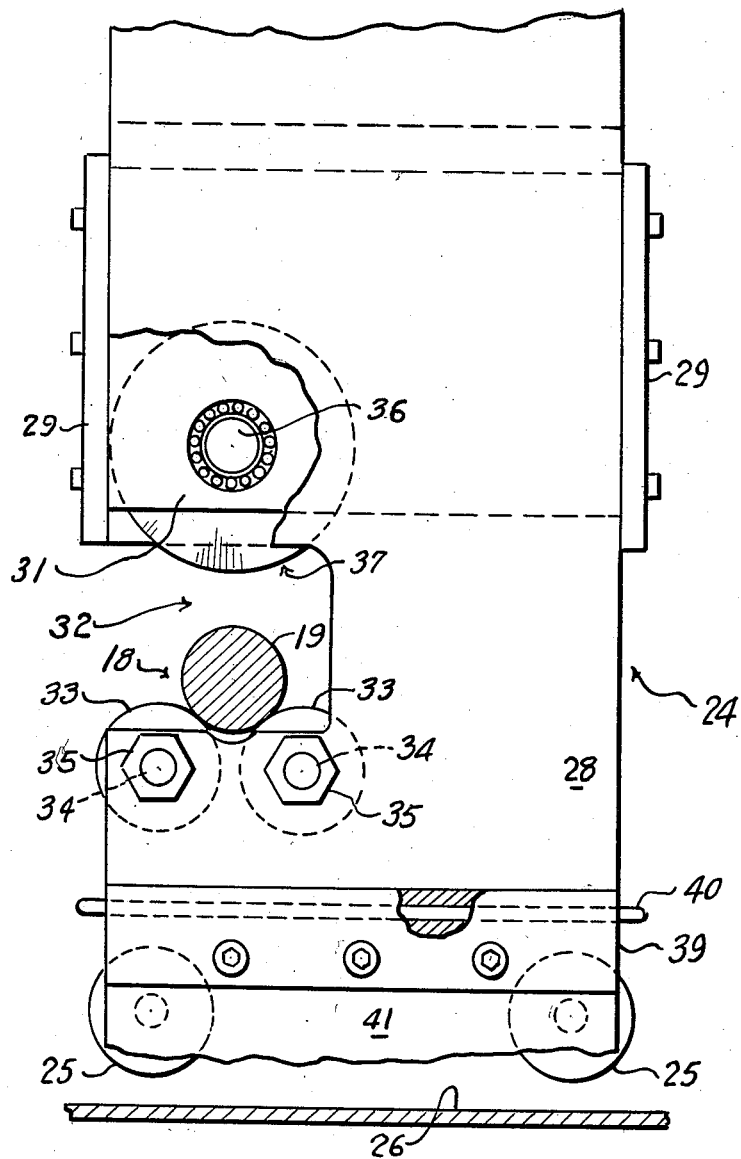
Fig. 4 is a side view of the apparatus shown in Fig. 3 taken substantially along the line 4—4 of Fig. 3; the operating portions of the apparatus being shown in a different position in the machine cycle.

The arbor 18 (see also Fig. 3) is solidly studded into the drive shaft 10 coaxially therewith and consists of several sections. First among these is a section having a cylindrical bearing surface 19 which is the same diameter as an outboard bearing surface 20 on the end of the arbor 18 adjacent its locking nut 21. Intermediate the two bearing surfaces 19 and 20 the arbor 18 carries or is formed into a mandrel-like die 22 having a profile configuration the same as the profile of the workpiece to be formed. In Fig. 3 a finished workpiece 23 is shown in place on the die 22 and a broken line indication 23a illustrates the fact that the diameter of the annular workpiece is not fixed by the diameter of the die 22 but can be substantially larger than the die 22. Of course, the minimum inside diameter of any portion of the finished workpiece 23 must be larger than the maximum outside diameter of any portion of the die 22. This limitation establishes the minimum size of the workpiece which can be formed on any particular die.

It is to be noted that the shaft 10 is journalled for rotation only and that it is not moved either axially or by translation during the operation of the apparatus. The shaft then might be called a cantilever shaft which is unsupported at its outer ends.

The apparatus of the invention provides for the outboard support of the shaft 10 during the forming operation as well as providing for the application of pressure to the forming dies between which a tubing section is eventually formed to a shape such as that illustrated in the drawings. The structure for supporting the shaft 10 during the forming operation may be generally divided into two mechanisms. The first of these is a carriage illustrated in side elevation in Fig. 4 and generally indicated at 24 in the drawings. The carriage 24 is supported by four roller wheels 25 for movement between a forward position shown in solid lines in Fig. 2 and a rear position shown in broken lines in Fig. 2, the rollers 25 running on simple tracks 26 formed by angle irons mounted on top of a station frame generally indicated at 27. The carriage 24 comprises a pair of heavy side plates 28 which are rigidly held in parallel spaced relationship by a pair of cross plates 29 to form an upwardly extending hollow structure. A hydraulic cylinder generally indicated at 30 is carried on top of the plates 28 and is provided with a usual hydraulic ram (not shown) extending downwardly between the plates 28 and terminating in a pair of heavy spaced plate-like arms 31 (see Fig. 3 particularly).

Each of the side plates 28 (see particularly Fig. 4) has a cutout 32 in its front edge, the two cutouts 32 being horizontally aligned with each other and providing an opening into which the end of the shaft 10 and the arbor 18 extend when the carriage 24 is in its forward position.

Two pairs of support rollers 33 are journalled upon horizontal stub shafts 34 mounted in the plates 28 and locked therein by heavy locking nuts 35. All of the support rollers 33 lie with their axes in the same horizontal plane and so spaced that the peripheries of the two support rollers engage the bearing surfaces 19 or 20 of the arbor 18 when the carriage 24 is raised into operating position, as will be later described. The stub shafts 34 are rigidly fixed in the side plates 28.

Forming pressure for forming the workpiece is applied through the ram arms 31 to a die supporting shaft 36 rotatably mounted in the arms 31 and carrying a rotary die 37 complementary to the arbor die 22. When the arbor 18 is engaged with the support rollers 33 hydraulic pressure in the cylinder 30 forces the ram arms 31 downwardly and forces the die 37 against the exterior of the section of preformed tubing overlying the arbor die 22. Rotation of the shaft 10 rolls the workpiece 23 around and as the upper die 37 is forced downwardly the profile of the workpiece 23 is modified by the coaction of the two dies 22 and 37 until it is formed into the shape defined by their complementary surfaces. Because both the shaft supporting rollers 33 and the ram 30 are mounted in the side plates 28, the thrust is withstood entirely by the side plates 28 and none is absorbed by the shaft 10 or by any other parts of the apparatus.

It will be observed, particularly in Fig. 3, that both the arbor die 22 and the upper die 37 are double in that each forms two annular flanged elements in reversed relationship to each other and that the upper die 37 has a disk-like center piece 38 which depresses an annular area of metal at the center of a workpiece 23 to define the edges of the two reversed annular flange pieces. By thus simultaneously forming two of the finished annular parts axial and radial dimensions of the two parts to be used together later in the formation of a single coupling (see Figs. 5 and 6) are maintained uniform and no problems of mismatching are encountered. The simultaneous forming of two parts also minimizes the chance of slippage of the workpiece relative to the dies.

An operator desiring to load a part into the arbor 18 or, in a similar manner, onto the arbor at the right end of the shaft 10 (not shown) first slides the particular carriage 24 to the rear of its track 26 and then inserts the short section of tubular stock or preformed part, axially over the outboard bearing surface 20 "hanging" the piece on the arbor die 22. He then pulls the carriage 24 back into position, or actuates mechanism which drives the carriage 24 into such position, and raises the carriage until the support rollers 33 engage the arbor 18. He then energizes the hydraulic cylinder 30 which forces the ram arms 31 downwardly for the forming operation already described. Removal of the workpiece 23 is accomplished by a reversal of these operations.

The apparatus of the invention also comprises mechanism for raising the work carriage 24 bodily in order to position the support rollers 33 in place to support the arbor 18 and shaft 10. This mechanism for raising the carriage 24 includes a pair of horizontal ways 39 which are parallel to the tracks 26 and which are engageable with a pair of slides 40 rigidly mounted on the side plates 28. The ways 39 are flared slightly at their ends to permit the easy entrance of the slides 40 thereinto when the carriage 24 is slid forwardly from its rear position.

Each of the ways 39 is rigidly secured on the upper end of a vertically slidable plate 41. Each of the plates 41 is mounted for vertical reciprocation in a pair of spaced vertical gibs 42 which are rigidly secured as by welding or bolting to spaced horizontal members of the station frame 27. The plates 41 are raised and lowered by the action of a hydraulic or pneumatic cylinder 43 having a piston rod 44 which is pivotally connected to a cross arm 45 (Figs. 1 and 2) extending transversely across the station frame 27 and linked at each of its ends to one of a pair of levers 46. Each of the levers 46 is pivoted on a heavy horizontal pin 47 studded into one of the gibs 42. At their work performing ends, the levers 46 are pinned to the bottoms of thrust rods 48, each of which extends upwardly through a hole 49 in the horizontal arm of a bracket 50 that is rigidly mounted on the corresponding one of the plates 41. A collar 51 is pinned or otherwise secured on each of the rods 48 and a coil spring 52 extends around the rod 48 between the collar 51 and the bracket 50.

When the cylinder 43 is energized its rod 44 is thrust downwardly swinging the levers 46 and thrusting upwardly on the collar 51 and the spring 52 and brackets 50, sliding the plates 41 upwardly. If the carriage 24 is in its forward position and its slides 40 are, therefore, engaged in the ways 39, the entire carriage 24 is lifted to the position shown in Fig. 4 to engage the peripheries of the support rollers 33 with the bearing surfaces 19 and 20 of the arbor 18.

Since both the rollers 33 and the hydraulic ram arms 31 are mounted on the heavy side plates 28, none of the thrust exerted in the hydraulic cylinder 30 for forming the part is delivered to the slides 40 or to the carriage support structure powered by the cylinder 43.

After the part is finished as described above, the operator first retracts the upper die 37. He then vents the cylinder 43 and the weight of the carriage 24 thrusts its support plates 41 and their associated mechanism downwardly until the carriage wheels 25 once again rest on the tracks 26. The operator may then cause the carriage 24 to move to its rearward position and remove the finished part off the arbor 18 by lifting it vertically until it is aligned and then moving it axially over the end of the arbor 18.

By providing the right and left-hand stations of the apparatus of the invention as shown in Fig. 1 and by equipping one of the stations with first forming tools and the other with finish forming tools, two separate phases of the entire forming cycle may be simultaneously performed on two different sets of annular flanged elements comprising the two workpieces in the machine. Of course if the operation can be performed by a single rolling, the dies at the two ends of the shaft may be identical and the production of the machine doubled. After each of the workpieces 23 has been put through both the first and finishing forming operations, the two reversed, identical flanged annular elements of each workpiece 23 may be separated from each other by a conventional parting operation, or they may already be separated as previously described.

In Figs. 5 and 6 two individual flanged elements 53 are shown in their assembled coupling position, being held adjacent each other by a split annular retainer ring 54 which has a clamping screw 55. The flanged elements 53 in Figs. 5 and 6 are in a reversed position relative to each other from the position in which they are formed as a unitary workpiece 23. Each of the flanged elements 53 is separated from its companion element by parting the workpiece 23 along the lines defined by the center piece 38 of the upper die 37 during the formation of the workpiece 23. Each of the elements 53 in a coupling assembled as illustrated in Figs. 5 and 6 normally is secured in some conventional manner to a length of tubing, pipe or other tubular structure coupled to a similar length by the two flanged elements 53 and their retainer ring 54.

It is, of course, apparent that apparatus embodying the instant invention is shown in the drawings for the rolling of an annular flanged element having a particular configuration and that suitable arbor dies 22 and upper dies 37 are shown to produce pieces having this configuration. Where an annular flanged workpiece of different profile is to be produced or where a different shape is to be formed in a tubular stock piece, the arbor die 22 may be replaced with an arbor die of suitable profile and the exterior or upper die 37 may be replaced with a complementary die of the same profile. Thus an apparatus embodying the invention provides for the rolling of annular or radially flanged and formed pieces of varying profile and different diameters by rolling the profile into a tubular section while yet providing a free end on the inner die carrying member over which the workpieces may be inserted and removed. These advantages of reduction in complexity of the machine, elemination of heavy structural bracing for the shaft 10 and increased speed of operation, while yet maintaining the support for the rotary shaft 10 which furnishes movement to the workpiece 23, are the objectives of the instant invention as set forth in the claims below.

I claim:

1. Apparatus for roll forming an annular element comprising, in combination, a rotary shaft having a normally unsupported free end, an interior die mounted co-axially on the end of said shaft for rotation therewith, a carriage movable between an operating position and a clearing position, spaced rotary means mounted on said carriage in line for supporting engagement beneath said shaft when said carriage is in operating position, a complementary exterior die, means for urging said complementary die toward said rotary support means, and other means engaged with said carriage when said carriage is in operating position for moving said carriage to place said rotary support means in engagement with said shaft.

2. Apparatus for roll forming an annular element comprising, in combination, a shaft journalled near its center with its ends free, an arbor die on the end of said shaft adapted to axially enter the open end of tube stock for rolling a configuration thereinto, horizontal guide rails extending laterally from said shaft, a carriage movable along said rails, between an operating position loosely embracing the end of said shaft and a clearing position remote from said shaft, rotary support rollers mounted on said carriage in position beneath said shaft when said carriage is in operating position, an exterior complementary rotary die and means for forcing the same toward said support rollers mounted on said carriage above said support rollers and in line with said arbor die, and a lifter mechanism adapted to raise and lower said carriage to move said support rollers into and out of supporting relationship with said shaft when said carriage is in operating position.

3. Apparatus according to claim 2 in which the lifter mechanism and the carriage have cooperating engageable slide and way means engaged when said carriage is in operating position and disengaged when said carriage is in clearing position.

4. Apparatus according to claim 2 in which there is an interior forming arbor die mounted on each end of said shaft and the apparatus has two sets of upper complementary dies, actuating means, carriages, and lifter mechanisms one at each end of said shaft for operation in cooperation with the respective one of said interior arbor dies.

5. Apparatus for roll forming an annular element comprising, in combination, a rotary shaft having a normally unsupported free end, an interior die mounted coaxially on the end of said shaft for rotation therewith, a support structure movable between an operating position and a clearing position, means on said structure fixed against translation with respect thereto in line for supporting engagement with said shaft when said structure is in operating position, a complementary exterior die, means for urging said complementary die toward said support means, and other means engaged with said support structure when said support structure is in operating position for moving said support structure to place said support means in engagement with said shaft.

6. Apparatus for roll forming an annular element comprising, in combination, a rotary shaft having a normally unsupported free end, an interior die mounted coaxially on the end of said shaft for rotation therewith, a support structure movable between an operating position and a clearing position, means on said structure in line for supporting engagement with said shaft when said structure is in operating position, a complementary exterior die, means for urging said complementary die toward said support means, and other means engaged with said support structure when said support structure is in operating position for moving said support means into engagement with said shaft.

7. Apparatus for roll forming an annular element comprising, in combination, a rotary shaft having a normally unsupported free end, an interior die having two corresponding reversed profiles, each corresponding to the configuration of a piece to be rolled from tube stock and a central disk-like portion intermediate the two profiles and radially recessed beyond the adjacent parts of the corresponding profiles for marking the stock between the edges of the two formed pieces, which die is mounted coaxially on the free end of said shaft for rotation therewith, a support structure movable between an operating position and a clearing position, means on said structure fixed against translation with respect thereto in line for supporting engagement with said shaft when said structure is in operating position, a complementary exterior die, means for urging said complementary die toward said support means, and other means engaged with said support structure when said support structure is in operating position for moving said support structure to place said support means in engagement with said shaft.

8. Apparatus for roll forming an annular element comprising, in combination, a rotary shaft having a normally unsupported free end, an interior die having two corresponding reversed profiles, each corresponding to the configuration of a piece to be rolled from tube stock, which die is mounted coaxially on the free end of said shaft for rotation therewith, a support structure movable between an operating position and a clearing position, means on said structure fixed against translation with respect thereto in line for supporting engagement with said shaft when said structure is in operating position, a complementary exterior die, means for urging said complementary die toward said support means, and other means engaged with said support structure when said support structure is in operating position for moving said support structure to place said support means in engagement with said shaft.

References Cited in the file of this patent

UNITED STATES PATENTS

| | | |
|---|---|---|
| 562,621 | Klatte | June 23, 1896 |
| 1,284,093 | Grotnes | Nov. 5, 1918 |
| 1,816,117 | Kline | July 28, 1931 |
| 1,945,693 | Kane | Feb. 6, 1934 |